(12) United States Patent
Pacheco et al.

(10) Patent No.: US 11,103,857 B2
(45) Date of Patent: Aug. 31, 2021

(54) PRODUCTION OF HYDROTHERMALLY STABLE CHA ZEOLITES

(71) Applicants: Joshua Pacheco, Narberth, PA (US); Bjorn Moden, West Chester, PA (US)

(72) Inventors: Joshua Pacheco, Narberth, PA (US); Bjorn Moden, West Chester, PA (US)

(73) Assignee: PQ Corporation, Valley Forge, PA (US)

( * ) Notice: Subject to any disclaimer, the term of this patent is extended or adjusted under 35 U.S.C. 154(b) by 0 days.

(21) Appl. No.: 16/296,907

(22) Filed: Mar. 8, 2019

(65) Prior Publication Data

US 2020/0038849 A1 Feb. 6, 2020

Related U.S. Application Data

(60) Provisional application No. 62/640,731, filed on Mar. 9, 2018.

(51) Int. Cl.

| | |
|---|---|
| *B01J 29/70* | (2006.01) |
| *C01B 39/48* | (2006.01) |
| *B01J 35/10* | (2006.01) |
| *B01J 37/04* | (2006.01) |
| *B01J 37/08* | (2006.01) |
| *B01J 37/30* | (2006.01) |
| *F01N 3/20* | (2006.01) |

(52) U.S. Cl.
CPC ....... *B01J 29/7015* (2013.01); *B01J 35/1033* (2013.01); *B01J 37/04* (2013.01); *B01J 37/08* (2013.01); *B01J 37/30* (2013.01); *F01N 3/208* (2013.01); *F01N 2570/14* (2013.01); *F01N 2610/02* (2013.01)

(58) Field of Classification Search
None
See application file for complete search history.

(56) References Cited

U.S. PATENT DOCUMENTS

| | | | | |
|---|---|---|---|---|
| 9,272,272 | B2 * | 3/2016 | Trukhan | B01D 53/9418 |
| 2011/0245067 | A1 * | 10/2011 | Nemeth | B01J 29/40 |
| | | | | 502/62 |
| 2012/0244066 | A1 * | 9/2012 | Bull | B01J 37/0246 |
| | | | | 423/703 |
| 2014/0352533 | A1 * | 12/2014 | Falconer | B01J 20/28033 |
| | | | | 95/51 |
| 2015/0092362 | A1 * | 4/2015 | Ahn | G02F 1/133305 |
| | | | | 361/749 |
| 2015/0151287 | A1 * | 6/2015 | Rivas-Cardona | B01J 29/763 |
| | | | | 423/703 |

* cited by examiner

*Primary Examiner* — Sheng H Davis
(74) *Attorney, Agent, or Firm* — Farabow, Henderson, Farabow, Garrett & Dunner, LLP

(57) ABSTRACT

A method of producing hydrothermally stable chabazite (CHA) zeolites is disclosed. The disclosed method is based on the use of reaction mixtures that (1) are essentially void of alkali metal cations and (2) contain the N,N,N-trimethyl-1-adamantyl ammonium (TMAda+) organic as the sole OSDA. The disclosed method results in a higher crystalline CHA zeolite that exhibits hydrothermal stability. There is also disclosed a zeolite material having a CHA-type framework structure made by the disclosed method. A method of selective catalytic reduction of NOx in exhaust gas using the material described herein is also disclosed.

20 Claims, 9 Drawing Sheets

PRODUCTION OF HYDROTHERMALLY STABLE CHA ZEOLITES

This application claims the benefit of priority to U.S. Provisional Application Nos. 62/640,731, filed Mar. 9, 2018, which is incorporated herein by reference in its entirety.

TECHNICAL FIELD

The present disclosure relates generally to a method of producing hydrothermally stable chabazite (CHA) zeolites, hydrothermally stable chabazite (CHA) zeolites made using the disclosed methods, and methods of selective catalytic reduction using the disclosed zeolites.

BACKGROUND

Aluminosilicate CHA-type zeolites are important components in commercial selective catalytic reduction (SCR) systems for $NO_x$ abatement in automotive applications. Due to the extreme conditions that automotive SCR catalysts are exposed to during operation, commercial CHA zeolites are required to display high thermal and hydrothermal stability.

Commercial CHA-type zeolites are typically produced from reaction mixtures that contain alkali cations. To obtain the highly stable form of the zeolite, an additional processing step (e.g. ion-exchange) is required to remove the unwanted alkali cations from the zeolite since the presence of alkali cations translates to significant losses in the hydrothermal stability of the final catalyst. Since this additional step to remove the alkali increases cost and lowers efficiency, production methods for highly stable CHA zeolites that do not require alkali cations in the reaction mixture are highly desirable.

Prior to this invention, other reported synthesis methods for CHA zeolites from reaction mixtures that are free of alkali metal cations produce catalysts that either (1) do not exhibit high hydrothermal stability characteristics that are required for commercial applications, or (2) require multiple organic structure directing agents (OSDAs) that increase complexity and cost. For example, U.S. Pat. No. 8,883,119 B2 Bull et al., describes aluminosilicate CHA molecular sieves prepared from reaction mixtures free of inorganic cations and containing tetramethylammonium ($TMA^+$) and N,N,N-trimethyl-1-adamantyl ammonium ($TMAda^+$) cations.

U.S. Pat. No. 4,544,538 to Zones et al. describes aluminosilicate CHA molecular sieves prepared from reaction mixtures containing inorganic cations and containing $TMAda^+$, N-methyl-3-quinuclidinol, or N,N,N-trimethyl-2-ammonium exonorborane cations.

Di Iorio et al., Chem. Mater., 2016 reports synthesis of aluminosilicate CHA from reaction mixtures free of inorganic cations and containing $TMAda^+$ cations. The zeolites prepared using this method exhibit poor hydrothermal stability, as shown herein in Comparative Examples 3-6.

Pham et al., Langmuir, 2013 reports synthesis of aluminosilicate CHA from reaction mixtures free of inorganic cations and containing $TMAda^+$ cations. The zeolites prepared using this method exhibit poor hydrothermal stability, as shown herein in Comparative Examples 7-9.

Loiland et al., Journal of Catalysis, 2014 reports synthesis of aluminosilicate CHA from reaction mixtures free of inorganic cations and containing $TMAda^+$ cations. The zeolites prepared using this method exhibit poor hydrothermal stability, as shown herein in Comparative Examples 7-9.

Eilertsen et al., Chem Cat Chem., 2011 reports synthesis of Ti-containing aluminosilicate CHA from reaction mixtures free of inorganic cations and containing $TMAda^+$ cations. Unlike the synthesis described herein, the Eilertsen reference relies on the use of titanium to synthesize their CHA. In addition, in this reference the calculated gel formulation is reported as 1 $SiO_2$/0.03 $Al_2O_3$/0.014 $TiO_2$/0.04 $H_2O_2$/0.66 TMAdaOH/27.40 $H_2O$, which is similar to the comparative examples described below. As described in the comparative examples (see, e.g., Comp. Examples 3-9 below) in the gel formulation of this reference the $H_2O/SiO_2$ and $TMAdaOH/SiO_2$ amounts are very high and fall outside the inventive ranges.

U.S. Pat. No. 9,334,171 B2 to Yilmaz et al. describes aluminosilicate LEV molecular sieves prepared from reaction mixtures free of inorganic cations and containing diethyldimethylammonium cations.

U.S. Published Application No. 2017/0107114 A1 to Gounder et al. describes aluminosilicate CHA molecular sieves prepared with controlled aluminum distribution by varying the amount of alkali cations in the synthesis mixture.

Peng et al., Microporous and Mesoporous Materials, 2018 reports hydrothermally stable CHA molecular sieves from alkali-free synthesis mixtures by utilizing a two stage, high-temperature synthesis method. This two stage, high-temperature syntheses is not used in the present disclosure.

The disclosed method of making a microporous crystalline material and the resulting zeolite material having a CHA-type framework structure are directed to overcoming one or more of the problems set forth above and/or other problems of the prior art. Unlike the prior art, for example, there is described a method for preparing CHA zeolites with high hydrothermally stability from alkali cation-free reaction mixtures that contain the N,N,N-trimethyl-1-adamantyl ammonium ($TMAda^+$) OSDA only. The stable CHA zeolites produced by the disclosed method can be uniquely identified by methods that measure the level of crystallinity. The Inventors have shown that micropore volume measurements, thermogravimetric analysis, and scanning electron microscope images can be used to easily differentiate the CHA zeolites prepared from these disclosed methods from CHA zeolites produced from prior synthetic methods that contain non-crystalline material.

SUMMARY

In one aspect, the present disclosure is directed to a method of making a microporous crystalline material from reaction mixtures that (1) are essentially void of alkali metal cations and (2) contain the N,N,N-trimethyl-1-adamantyl ammonium (TMAda+) organic as the sole OSDA. In an embodiment, the method comprises mixing sources of alumina, silica, water, TMAdaOH and optionally a chabazite seed material to form a gel. The method further comprises heating the gel in a vessel at a temperature ranging from 80° C. to 200° C. to form a crystalline chabazite product. The method further comprises calcining the product to produce an aluminosilicate zeolite having a CHA structure, and a silica-to-alumina ratio (SAR) ranging from 20 to 100, such as from 20 to 70.

In an embodiment, there is disclosed a zeolite material having a CHA-type framework structure, having a micropore volume to total pore volume ratio greater than 90%, which is derived from a pre-calcined, organic containing zeolite having a measured TMAda+/cage ratio of less than 1.05.

In another embodiment, there is disclosed a method of selective catalytic reduction (SCR) of NOx in exhaust gas using the material described herein. For example, in an embodiment, the method comprises contacting exhaust gas with a zeolitic material comprising a copper containing CHA-type zeolites having a micropore volume to total pore volume ratio greater than 90% and derived from a pre-calcined, organic containing zeolite having a measured TMAda+/cage ratio of less than 1.05. As previously mentioned, the measurement for TMAda+/cage ratio of less than 1.05 is done prior to calcination. In an embodiment, the method of SCR described herein utilizes a copper containing chabazite that retains at least 70% of its initial surface area and micropore volume after exposure to temperatures of up to 900° C. in the presence of up to 10 volume percent water vapor for up to 1 hour.

Aside from the subject matter discussed above, the present disclosure includes a number of other features such as those explained hereinafter. Both the foregoing description and the following description are exemplary only.

BRIEF DESCRIPTION OF THE DRAWINGS

The accompanying figures are incorporated in, and constitute a part of this specification.

DETAILED DESCRIPTION

Figure 1:
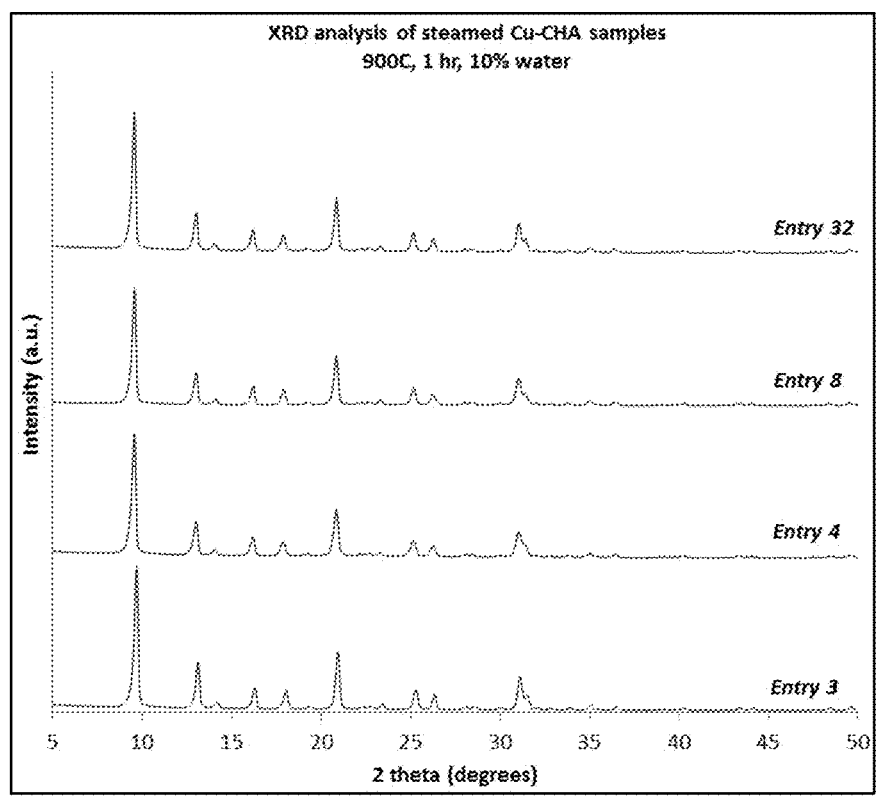
FIG. 1 shows X-ray diffraction patterns of Cu-CHA zeolites from entries 3, 4, 8, and 32 in Table 1.
Figure 2:
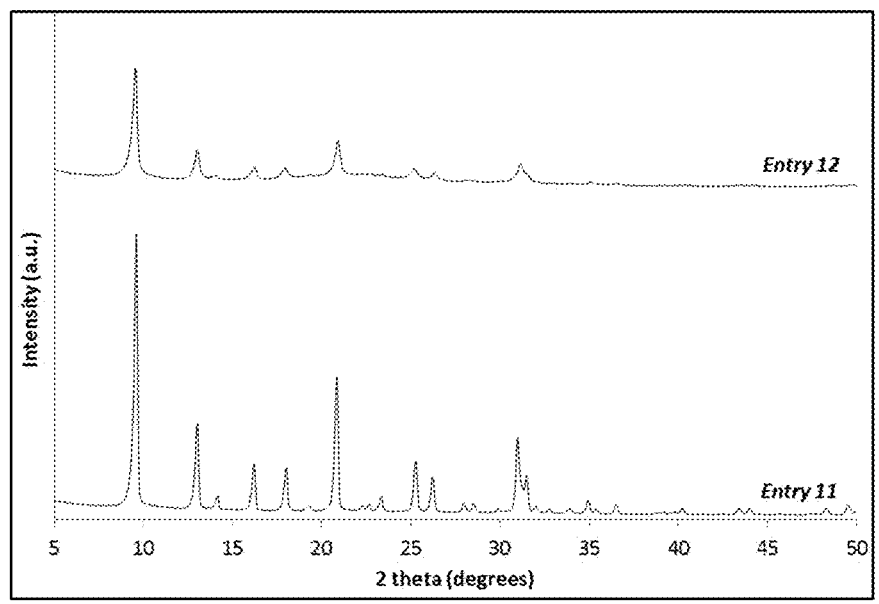
FIG. 2 shows X-ray diffraction patterns of Cu-CHA zeolites from entries 11 and 12 in Table 1.
Figure 3:
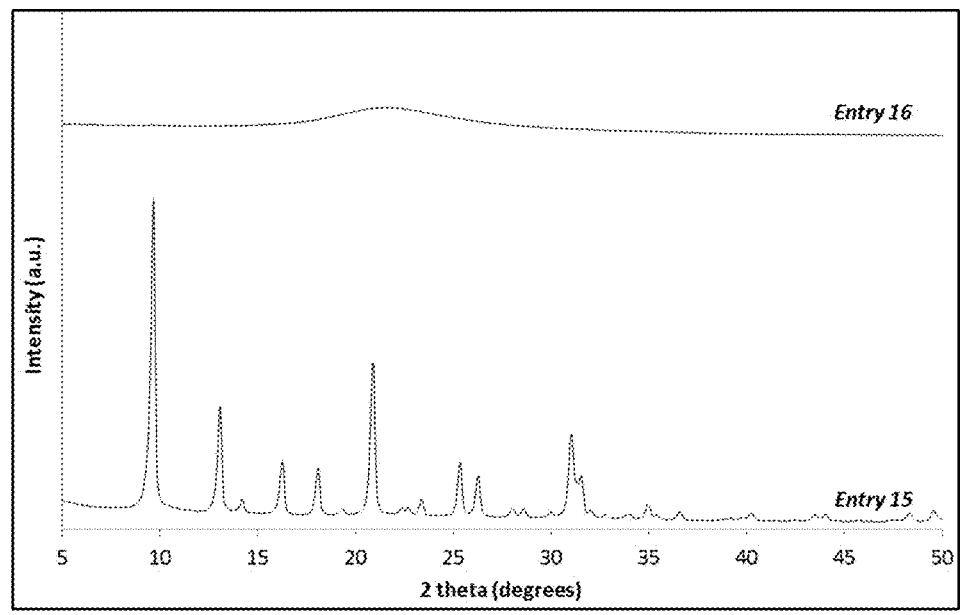
FIG. 3 shows X-ray diffraction patterns of Cu-CHA zeolites from entries 15 and 16 in Table 1.
Figure 4:
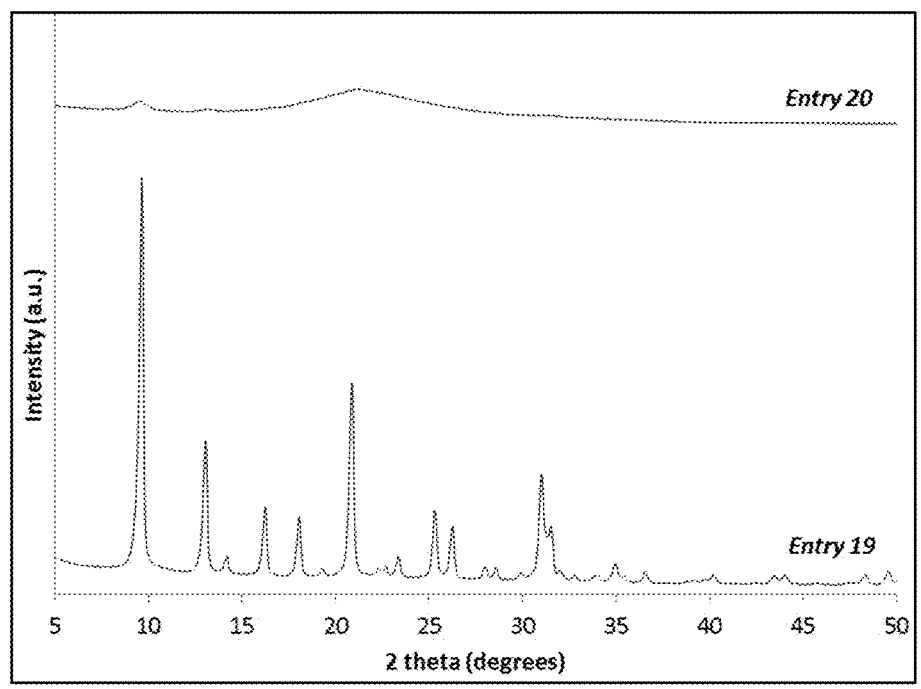
FIG. 4 shows X-ray diffraction patterns of Cu-CHA zeolites from entries 19 and 20 in Table 1.
Figure 5:
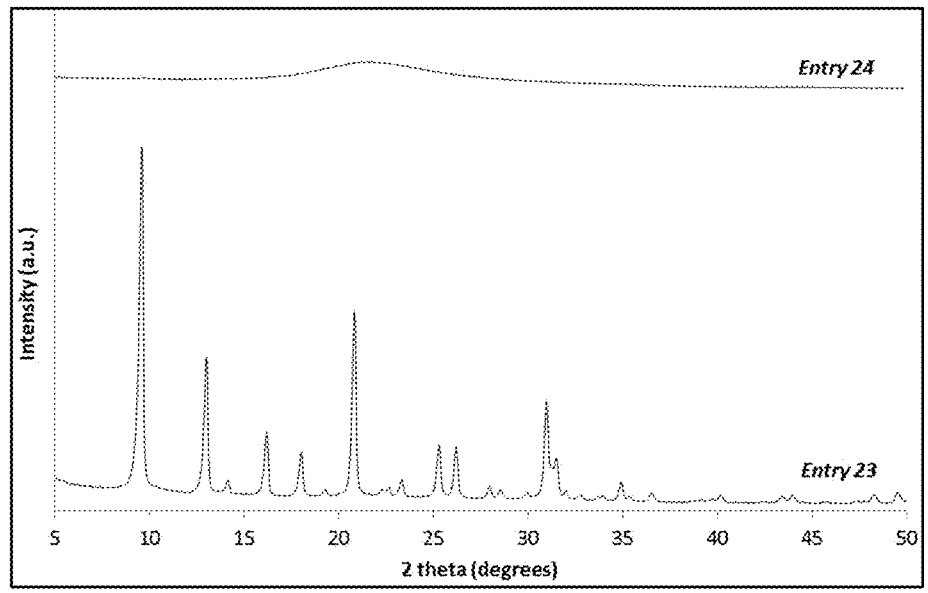
FIG. 5 shows X-ray diffraction patterns of Cu-CHA zeolites from entries 23 and 24 in Table 1.
Figure 6:
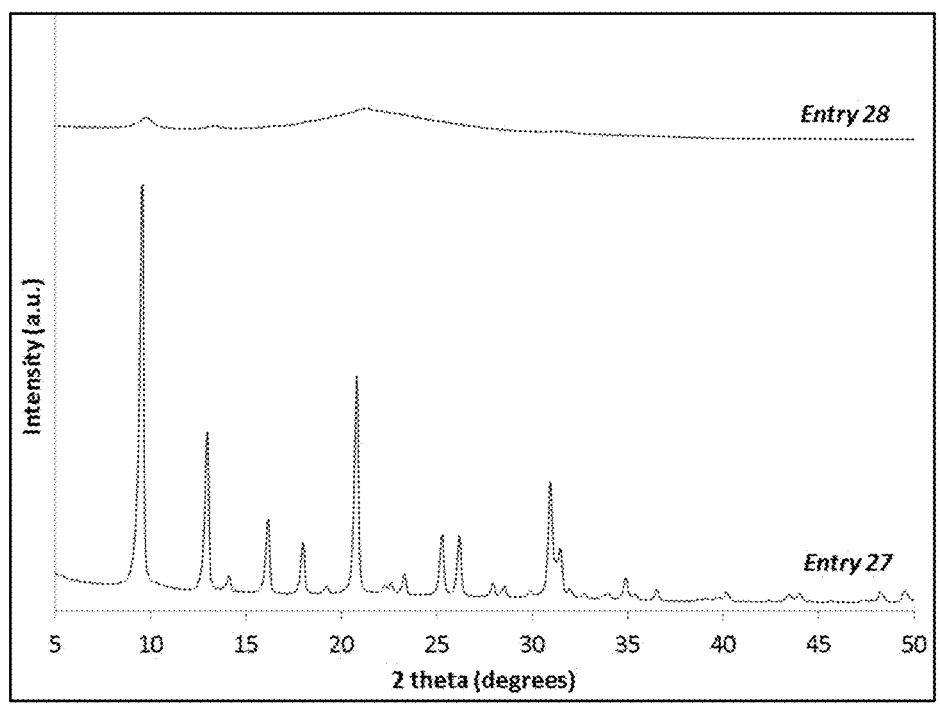
FIG. 6 shows X-ray diffraction patterns of Cu-CHA zeolites from entries 27 and 28 in Table 1.
Figure 7:
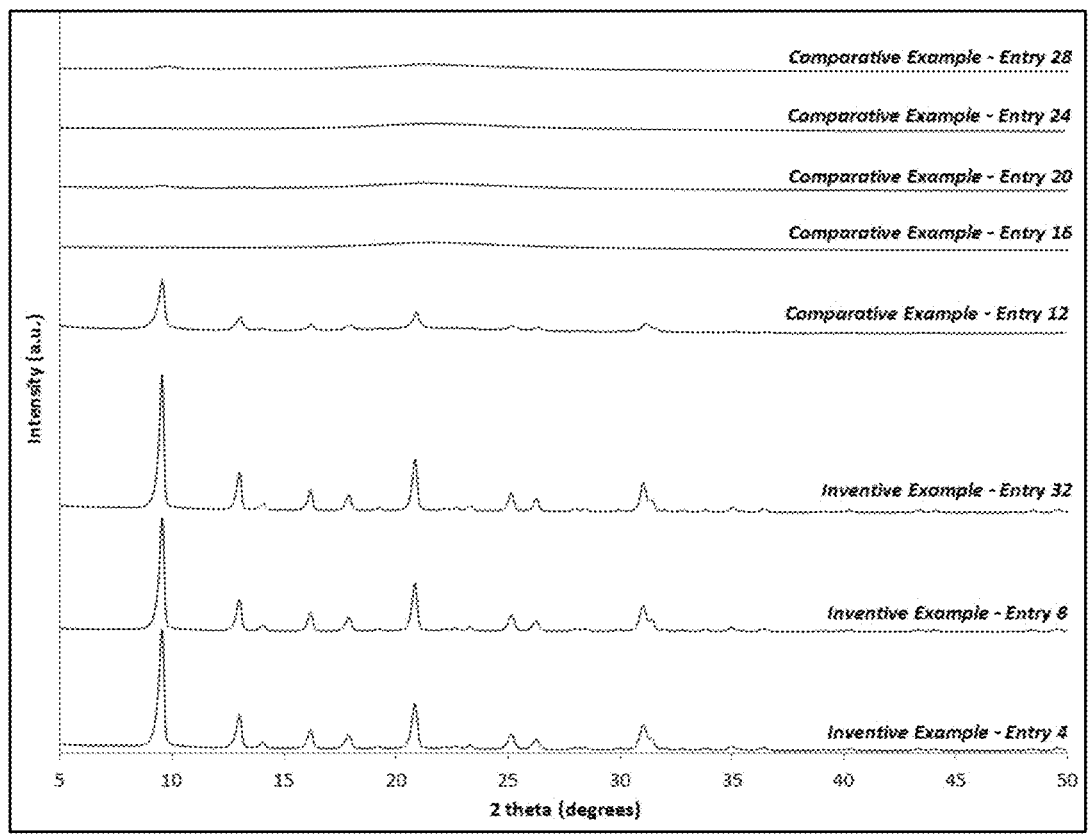
FIG. 7 is a Comparison of Inventive Examples vs. Comparative Examples: XRD patterns of hydrothermally treated materials.

Generally zeolite materials that are highly crystalline are more thermally and hydrothermally stable than zeolite materials that are partially non-crystalline.

As used herein, "Initial Surface Area" refers to the surface area of the freshly made crystalline material before exposing it to any aging conditions.

As used herein, "Micropore volume" refers to indicate the total volume of pores having a diameter of less than 20 angstroms. "Initial Micropore Volume" means the micropore volume of the freshly made crystalline material, i.e., before exposing it to any aging conditions. The assessment of micropore volume is particularly derived from the BET measurement techniques by an evaluation method called the t-plot method (or sometimes just termed the t-method) as described in the literature (Journal of Catalysis 3, 32 (1964)).

As used herein, "Mesopore volume" refers to the volume of pores having a diameter of greater than 20 angstroms up to the limit of 600 angstroms.

As used herein, "Total pore volume" refers to the sum of the micropore volume and mesopore volume.

As used herein, "micropore area" refers to the surface area in pores less than 20 angstroms, and "mesopore area" refers to the surface area in pores between 20 angstroms and 600 angstroms.

As used herein, "essentially void of alkali metal cations," means that the method of making a zeolite was done without the use of alkali cations, such as Li, Na, K, Rb and Cs, during synthesis. This term also refers to fact that the resulting material has never been in contact with an alkali cation during any processing step.

There is described a method of making a microporous crystalline material from reaction mixtures that (1) are essentially void of alkali metal cations and (2) contain the N,N,N-trimethyl-1-adamantyl ammonium (TMAda+) organic as the sole OSDA. In an embodiment, the method comprises mixing sources of alumina, such as aluminum trihydroxide, silica, such as silica sol, water, TMAdaOH and optionally a chabazite seed material to form a gel. Next the gel is heated in a vessel at a temperature ranging from 80° C. to 200° C. to form a crystalline chabazite product; and calcining the product to produce an aluminosilicate zeolite having a CHA structure, and a silica-to-alumina ratio (SAR) ranging from 20 to 100, such as from 20 to 70.

Non-limiting examples of sources of alumina that may be used in the present disclosure include aluminum hydroxide, alumina, alumina hydrates, aluminum alkoxides, aluminum nitrate, aluminum sulfate and aluminum acetate. In an embodiment, the source of alumina, e.g., aluminum trihydroxide, is dissolved into a TMAdaOH solution.

Non-limiting examples of sources of silica that may be used in the present disclosure include colloidal silica, silica gel, precipitated silica, silica-alumina, fumed silica, silicon alkoxides, and the like. In an embodiment, the colloidal silica (silica sol) is stabilized with ammonium ions rather than alkali ion, such as sodium and potassium.

The disclosed method describes ratios for various aspects of the gel. For example, the gel may have a water to silica ($H_2O/SiO_2$) molar ratio of 5-20. The gel may also have a TMAdaOH to silica (TMAdaOH/$SiO_2$) molar ratio ranging from 0.05-0.15.

In an embodiment, the reaction mixtures comprise (A) molar composition 1 $SiO_2$:w $Al_2O_3$:x TMAdaOH:y $H_2O$, where w ranges from 0.010-0.050, such as from 0.014-0.050; x ranges from 0.04-0.20, such as from 0.05-0.15; and y ranges from 1-25, such as from 5-20 and (B) trace concentrations of alkali cations.

In one embodiment, the method further comprises adding to the microporous crystalline material at least one metal chosen from copper, iron or combinations thereof to form a metal containing chabazite. In an embodiment, the metal containing chabazite described herein retains at least 70% of its initial surface area and micropore volume after exposure to temperatures of up to 900° C. in the presence of up to 10 volume percent water vapor for up to 1 hour.

The metal may be added by known methods. For example, copper and/or iron may be introduced by liquid-phase or solid ion-exchange or impregnation or incorporated by direct-synthesis. In an embodiment, the metal comprises copper in an amount of at least 1.0 weight percent of the total weight of the material, such as an amount ranging from 1.0 to 6.0 weight percent of the total weight of the material. In addition, or alternatively, the metal comprises iron comprises in an amount of at least 0.5 weight percent of the total weight of the material, such as an amount ranging from 0.5 to 6.0 weight percent of the total weight of the material.

In one embodiment, during the described heating step, the gel is stirred while a seed material with the CHA topology is added before loading into an autoclave to ensure a chabazite crystal structure is formed.

Non-limiting examples of sources of copper that may be used in the present disclosure include copper salts such as cupric acetate, cupric nitrate, cupric sulfate, cupric hydroxide and cupric chloride. In an embodiment, there is described a method in which after calcining, the resulting calcined zeolite is ion-exchanged with copper using a copper (II) acetate solution. The resulting copper containing chabazite has an initial surface area of the is at least 650 $m^2/g$ and an initial micropore volume of at least 0.25 cc/g.

The method described herein is used to make an alkali-free zeolite material having a CHA-type framework structure. In one embodiment, this alkali-free zeolite material has a micropore volume to total pore volume ratio greater than 90% and derived from a pre-calcined, organic containing zeolite having a measured TMAda+/cage ratio of less than 1.05.

As stated, the disclosed zeolite typically has an SAR ranging from 20-100, such as from 20-70. The disclosed zeolite may further comprise at least one metal chosen from copper, iron or combinations thereof, in the amounts previously mentioned, copper in an amount of at least 1.0 weight percent of the total weight of the material, such as an amount ranging from 1.0 to 6.0 weight percent of the total weight of the material. In addition, or alternatively, the metal comprises iron comprises in an amount of at least 0.5 weight percent of the total weight of the material, such as an amount ranging from 0.5 to 6.0 weight percent of the total weight of the material.

As stated, the metal containing chabazite retains at least 70% of its initial surface area and micropore volume after exposure to temperatures of up to 900° C. in the presence of up to 10 volume percent water vapor for up to 1 hour.

In an embodiment, the zeolite described herein may have a micropore volume to total pore volume ratio that is greater than 90%, such as greater than 92% or even greater than 95%.

There is also disclosed a method of selective catalytic reduction (SCR) of NOx in exhaust gas using the disclosed CHA-type zeolites. This method comprises contacting exhaust gas with a zeolitic material comprising a copper containing CHA-type zeolites having a micropore volume to total pore volume ratio greater than 90% and a measured TMAda+/cage ratio of less than 1.05, wherein said copper containing chabazite retains at least 70% of its initial surface area and micropore volume after exposure to temperatures of up to 900° C. in the presence of up to 10 volume % water vapor for up to 1 hr. The method of SCR described herein is typically performed in the presence of ammonia or urea.

EXAMPLES

The following non-limiting examples, which are intended to be exemplary, further clarify the present disclosure.

Example 1—Alkali-Free CHA Synthesis

Aluminum trihydroxide (55% $Al_2O_3$, Sigma-Aldrich) is dissolved into a TMAdaOH solution (25 wt. % in water) for about 15 minutes followed by slow addition of silica sol (40% $SiO_2$, Ludox AS-40). The gel is stirred for 80 minutes and seed material with the CHA topology was added (2.5 wt. % of total silica) before loading into a stainless steel autoclave (Parr Instruments, 2000 ml). The molar composition of the gel was 1.0 $SiO_2$/0.033 $Al_2O_3$/0.11 TMAdaOH/9.0 $H_2O$. The autoclave was heated to 160° C. and maintained at the temperature for 36 hours while stirring at 200 RPM. After cooling, the product was recovered by filtration, washed with deionized water, and dried in a 110° C. convection oven. The as-synthesized product had the X-ray diffraction pattern of chabazite, a $SiO_2/Al_2O_3$ ratio (SAR) of 32.9 and contained 0.04 wt. % $Na_2O$ as summarized in Table 1. The occluded organic in the dried as-synthesized zeolite was removed by calcination in air at 600° C. for 6 hours. The calcined zeolite was ion-exchanged in a copper (II) acetate solution at 60° C.

Example 2—Alkali-Free CHA Synthesis

Another sample was prepared using the same protocol as described in Comparative Example 2, except the molar composition of the final mixture was adjusted to prepare a CHA zeolite with a different SAR. The composition of the final reaction mixture was 1.0 $SiO_2$/0.036 $Al_2O_3$/0.12 TMAdaOH/9.37 $H_2O$. The autoclave was heated to 160° C. and maintained at the temperature for 96 hours while stirring at 200 RPM.

Example 3—Alkali-Free CHA Synthesis

Aluminum trihydroxide (55% $Al_2O_3$, Sigma-Aldrich) is dissolved into a TMAdaOH solution (20 wt. % in water) for about 15 minutes followed by slow addition of silica sol (40% $SiO_2$, Ludox AS-40). The gel is stirred for 80 minutes and seed material with the CHA topology was added (2.5 wt. % of total silica) before loading into a stainless steel autoclave (Parr Instruments, 2000 ml). The molar composition of the gel was 1.0 $SiO_2$/0.027 $Al_2O_3$/0.10 TMAdaOH/9.79 $H_2O$. The autoclave was heated to 160° C. and maintained at the temperature for 36 hours while stirring at 200 RPM. After cooling, the product was recovered by filtration, washed with deionized water, and dried in a 110° C. convection oven. The as-synthesized product had the X-ray diffraction pattern of chabazite, a $SiO_2/Al_2O_3$ ratio (SAR) of 40.5 and contained 0.00 wt. % $Na_2O$ as summarized in Table 1. The occluded organic in the dried as-synthesized zeolite was removed by calcination in air at 600° C. for 6 hours. The calcined zeolite was ion-exchanged in a copper (II) acetate solution at 60° C.

Example 4—Hydrothermal Stability Testing

The hydrothermally stability of the Cu-CHA zeolites in Example 1, Example 2, and Example 3 were tested by heating to 900° C. for 1 hour in flowing air containing 10% moisture. The surface area, micropore volumes, and X-ray diffraction (XRD) patterns of the material were compared before and after the hydrothermal treatment and the results are summarized in Table 1 and FIG. 1. The zeolite prepared using the disclosed methods described herein remained highly crystalline after hydrothermal treatment at 900° C.

TABLE 1

Analytical data for materials prepared in Inventive and Comparative Examples.

| Entry | Form | SAR | Na$_2$O (wt %) | CuO (wt %) | XRD | SA (m$^2$/g) | MPV (cm$^3$/g) |
|---|---|---|---|---|---|---|---|
| \multicolumn{8}{l}{Example 1 -- Current Invention} |
| 1 | As-synthesized | 32.9 | 0.04 | | CHA | — | — |
| 2 | Calcined | | | | CHA | 824 | 0.31 |
| 3 | Cu-exchanged | 29.9 | 0.00 | 3.1 | CHA | 743 | 0.28 |
| 4 | Hydrothermally aged | | | | CHA | 696 | 0.26 |
| \multicolumn{8}{l}{Example 2 -- Current Invention} |
| 5 | As-synthesized | | | | CHA | — | — |
| 6 | Calcined | 28.9 | 0.10 | | CHA | 795 | 0.30 |
| 7 | Cu-exchanged | 26.7 | 0.00 | 3.0 | CHA | 779 | 0.29 |
| 8 | Hydrothermally aged | | | | CHA | 728 | 0.27 |
| \multicolumn{8}{l}{Comparative Example 1 -- Bull et al. U.S. Pat. No. 8,883,119 B2} |
| 9 | As-synthesized | 28.9 | 0.21 | | CHA | | |
| 10 | Calcined | | | | CHA | 862 | 0.31 |
| 11 | Cu-exchanged | 26.6 | 0.02 | 3.1 | CHA | 815 | 0.29 |
| 12 | Hydrothermally aged | | | | CHA + amorph. | 414 | 0.13 |
| \multicolumn{8}{l}{Comparative Example 3 -- Di Iorio et al., Chem. Mater. 2016, 28, 2236-2247} |
| 13 | As-synthesized | 20.1 | 0.77 | | CHA | | |
| 14 | Calcined | | | | CHA | 879 | 0.32 |
| 15 | Cu-exchanged | 18.1 | 0.07 | 3.1 | CHA | 832 | 0.30 |
| 16 | Hydrothermally aged | | | | amorph. | 4 | 0.00 |
| \multicolumn{8}{l}{Comparative Example 4 -- Di Iorio et al., Chem. Mater. 2016, 28, 2236-2247} |
| 17 | As-synthesized | | | | CHA | | |
| 18 | Calcined | 28.1 | 0.40 | | CHA | 886 | 0.32 |
| 19 | Cu-exchanged | 26.1 | 0.04 | 3.3 | CHA | 837 | 0.30 |
| 20 | Hydrothermally aged | | | | amorph. | | |
| \multicolumn{8}{l}{Comparative Example 7 -- Loiland, et al., Jour. Catal. 2014, 311, 412-423 and Pham, et al., Langmuir 2013, 29, 832-839} |
| 21 | As-synthesized | 21.6 | 0.08 | | CHA | | |
| 22 | Calcined | | | | CHA | 917 | 0.33 |
| 23 | Cu-exchanged | 19.4 | 0.01 | 3.0 | CHA | 867 | 0.31 |
| 24 | Hydrothermally aged | | | | amorph. | 10 | 0.00 |
| \multicolumn{8}{l}{Comparative Example 8 -- Loiland, et al., Jour. Catal. 2014, 311, 412-423 and Pham, et al., Langmuir 2013, 29, 832-839} |
| 25 | As-synthesized | | | | CHA | | |
| 26 | Calcined | | | | CHA | 899 | 0.33 |
| 27 | Cu-exchanged | 26.7 | 0.03 | 3.1 | CHA | 839 | 0.30 |
| 28 | Hydrothermally aged | | | | amorph. | | |
| \multicolumn{8}{l}{Example 3 -- Current Invention} |
| 29 | As-synthesized | 40.5 | 0.00 | | CHA | | |
| 30 | Calcined | | | | CHA | 750 | 0.29 |
| 31 | Cu-exchanged | 37.0 | 0.01 | 3.14 | CHA | 712 | 0.28 |
| 32 | Hydrothermally aged | | | | CHA | 663 | 0.25 |

Comparative Example 1

The method disclosed by Bull et al. in U.S. Pat. No. 8,883,119 B2 in Comparative Example 4 is an example of the preparation of CHA zeolites from a gel that contains N,N,N-trimethyl-1-adamantyl ammonium (TMAda$^+$) cations only without the addition of alkali cations. In this Example, the method was reproduced as closely as possible for comparison to the current disclosed methods. Aluminum isopropoxide (Sigma-Aldrich) was added to a TMAdaOH solution (20 wt. % in water) and the resulting suspension was stirred for about 60 minutes. Next, Ludox AS-40 was added and the resulting gel was stirred for 20 minutes. The pH of the gel was measured to be 13.28 and is close to the reported 13.5. The gel was loaded into a stainless steel autoclave (Parr Instruments, 2000 ml). The molar composition of the gel was 36 SiO$_2$/2.4 Al isopropoxide/6.2 TMAdaOH/469 H$_2$O and is nearly identical to the reported gel composition of 36 SiO$_2$/2.4 Al isopropoxide/6.2 TMAdaOH/468 H$_2$O. The autoclave was heated to 170° C. and maintained at the temperature for 48 hours while stirring at 200 RPM.

After cooling, the product was recovered by filtration, washed with deionized water, and dried in a convection oven at 110° C. The occluded organic in the dried as-synthesized zeolite was removed by calcination in air at 600° C. for 6 hours. The Na$_2$O content and SAR of the material (0.21 wt % Na$_2$O and 28.9 SAR) was very similar to those reported in Comparative Example 4 of U.S. Pat. No. 8,883,119 B2 (0.17 wt Na$_2$O & and 30 SAR). The SEM image also indicates a similar material to that reported in Comparative Example 4 of U.S. Pat. No. 8,883,119 B2 and appears to consist of large agglomerates of small crystallites.

The calcined zeolite was ion-exchanged in a copper (II) acetate solution at 60° C.

Comparative Example 2

Another sample was prepared using the same protocol as described in Comparative Example 1. The molar composition of the gel was 36 $SiO_2$/2.4 Al isopropoxide/6.2 TMAdaOH/469 $H_2O$. The $Na_2O$ content and SAR of the produced material (0.19 wt % $Na_2O$ and 29.0 SAR) was very similar to those reported in U.S. Pat. No. 8,883,119 B2 (0.17 wt $Na_2O$ and an SAR of 30). The SEM image also indicates a similar material to that reported in U.S. Pat. No. 8,883,119 B2 and appears to consist of large agglomerates of small crystallites.

Comparative Example 3

The methods disclosed by Di Iorio et al., Chem. Mater. 2016, 28, 2236-2247 for the synthesis of SSZ-13 zeolites describes the preparation of CHA zeolites from a gel that contains N,N,N-trimethyl-1-adamantyl ammonium (TMAda$^+$) cations only without the addition of alkali cations. In this example, the method was reproduced as closely as possible for comparison to the current disclosed methods. A TMAdaOH solution (25 wt. % in water) was added to DI water and the mixture was stirred for 15 minutes at ambient conditions. To this solution, aluminum trihydroxide (SPI Pharma, Product 110-0200) was added and the mixture was stirred for 15 minutes. Next, a silica sol (40% $SiO_2$, Ludox HS-40) was added and the resulting gel was stirred for 2 more hours at ambient conditions. The final mixture was loaded into a series of 45 ml Teflon-lined stainless steel autoclaves (Parr Instruments) that were heated to 160° C. under rotating (40 RPM) conditions for 6 days. The molar composition of the final mixture was 1.0 $SiO_2$/0.032 $Al_2O_3$/0.5 TMAdaOH/44.1 $H_2O$. After cooling, the product was recovered by filtration, washed with deionized water, and dried in a 110° C. convection oven. The occluded organic in the dried as-synthesized zeolite was removed by calcination in air at 600° C. for 6 hours. The calcined zeolite was ion-exchanged in a copper (II) acetate solution at 60° C.

Comparative Example 4

Another sample was prepared using the same protocol as described in Comparative Example 3, except the molar composition of the final mixture was adjusted to prepare a CHA zeolite with a different SAR. The composition of the final reaction mixture was 1.0 $SiO_2$/0.0205 $Al_2O_3$/0.5 TMAdaOH/44.1 $H_2O$.

Comparative Example 5

Another sample was prepared using the same protocol as described in Comparative Example 3, except the molar composition of the final mixture was adjusted to prepare a CHA zeolite with a different SAR. The composition of the final reaction mixture was 1.0 $SiO_2$/0.0145 $Al_2O_3$/0.5 TMAdaOH/44.1 $H_2O$.

Comparative Example 6

Another sample was prepared using the same protocol as described in Comparative Example 4. The composition of the final reaction mixture was 1.0 $SiO_2$/0.0205 $Al_2O_3$/0.5 TMAdaOH/44.1 $H_2O$.

Comparative Example 7

The methods disclosed by Loiland, et al., Journal of Catalysis 2014, 311, 412-423 and Pham, et al., Langmuir 2013, 29, 832-839 for the synthesis of SSZ-13 zeolites describes the preparation of CHA zeolites from a gel that contains N,N,N-trimethyl-1-adamantyl ammonium (TMAda$^+$) cations only without the addition of alkali cations. In this Example, the method was reproduced as closely as possible for comparison to the current disclosed methods. To a TMAdaOH solution (25 wt. % in water), DI water and tetraethyl orthosilicate (98%, Sigma-Aldrich) was added and the mixture was stirred for 2 hours at ambient conditions. Next, aluminum ethoxide (99%, Strem Chemical) was added and the mixture was stirred while covered for 24 hr at ambient conditions.

Figure 15:
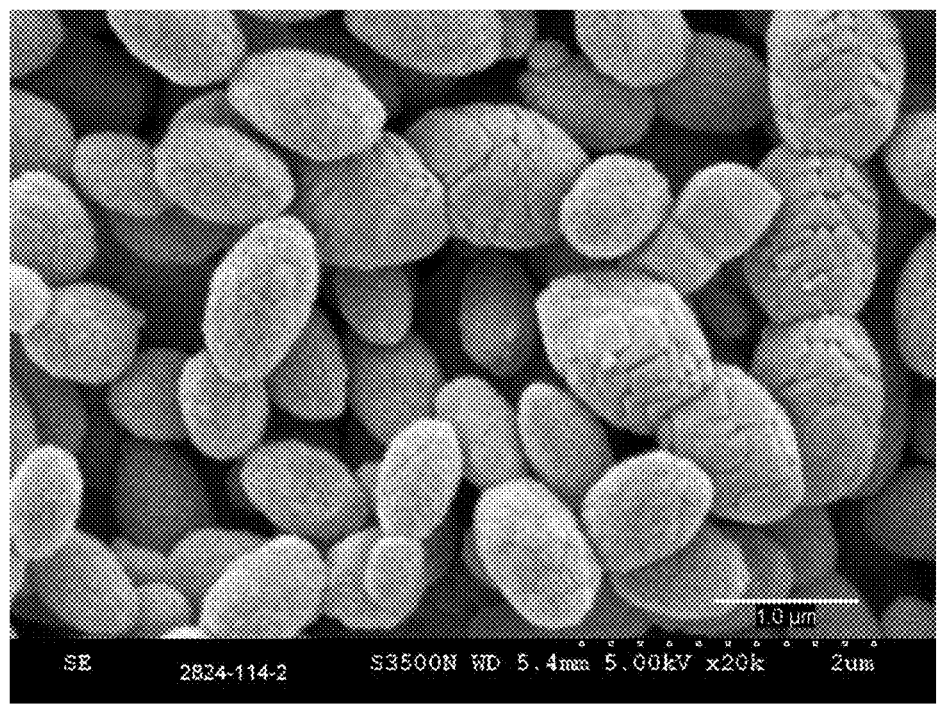
FIG. 15 SEM image of Comparative Example 7.

The mixture was loaded into 125 ml Teflon-lined stainless steel autoclaves and heated statically at 140° C. for 6 days. The molar composition of the final mixture, based on the assumption that the masses of reagents used in the Loiland et al. reference were correct, was 1.0 $SiO_2$/0.036 $Al_2O_3$/0.51 TMAdaOH/20.7 $H_2O$. After cooling, the product was recovered by filtration, washed with deionized water, and dried in a 110° C. convection oven. The occluded organic in the dried as-synthesized zeolite was removed by calcination in air at 600° C. for 6 hours. The SEM image of the prepared material (FIG. 15) is very similar to that reported in Loiland, et al. and Pham, et al. consisting mainly of ~0.5-1 µm particles. The calcined zeolite was ion-exchanged in a copper (II) acetate solution at 60° C.

Comparative Example 8

Another sample was prepared using the same protocol as described in Comparative Example 7, except the molar composition of the final mixture was adjusted to prepare a CHA zeolite with a different SAR. The composition of the final reaction mixture was 1.0 $SiO_2$/0.0245 $Al_2O_3$/0.51 TMAdaOH/20.7 $H_2O$.

Comparative Example 9

Figure 16:
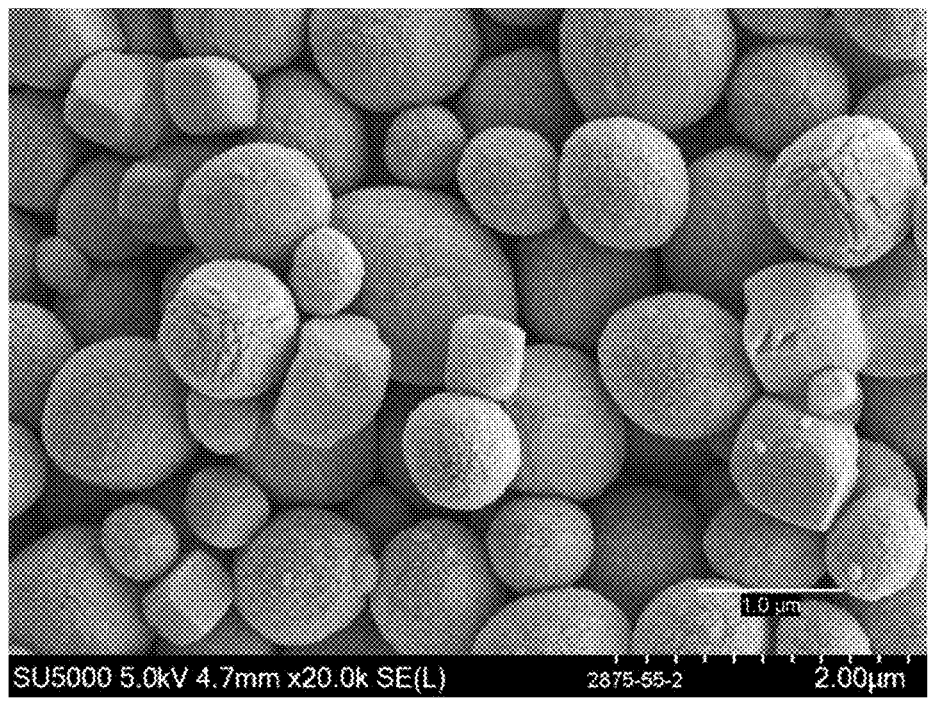
FIG. 16 SEM image of Comparative Example 9.

Another sample was prepared using the same protocol as described in Comparative Example 8. The composition of the final reaction mixture was 1.0 $SiO_2$/0.0245 $Al_2O_3$/0.51 TMAdaOH/20.7 $H_2O$. The SEM image of the prepared material (FIG. 16) is very similar to that reported in Loiland, et al. and Pham et al. consisting mainly of ~0.5-1 µm particles.

Comparative Example 10—Hydrothermal Stability Testing

The hydrothermally stability of the Cu-CHA zeolites prepared from the different prior methods was tested by heating to 900° C. for 1 hour in flowing air containing 10% moisture. The surface area, micropore volumes, and X-ray diffraction (XRD) patterns of the materials were compared before and after the hydrothermal treatment and the results are summarized in Table 1. The zeolites prepared using the disclosed methods of this invention remained highly crystalline after hydrothermal treatment at 900° C. while the comparative materials lost most or all of the starting crystallinity.

Comparative Example 11

This comparative examples summarizes methods used to identify and differentiate CHA zeolites prepared using the disclosed synthetic method from non-stable CHA zeolites prepared using prior synthetic methods.

It is well known that zeolite materials exhibiting high crystallinity are more thermally and hydrothermally stable than zeolite materials that are partially non-crystalline. The stable CHA zeolites produced by the disclosed method are shown here to be highly crystalline with very low levels of non-crystalline material, and these materials can be uniquely identified by methods that measure levels of crystallinity. As shown, micropore volume measurements, thermogravimetric analysis, and scanning electron microscope images can be used to differentiate the CHA zeolites prepared from the current disclosed methods from CHA zeolites produced from prior synthetic methods that contain non-crystalline material.

Micropore Volume Measurements:

For highly crystalline zeolites, most of the measured pore volume will be attributed to micropore volume since zeolites are purely microporous materials. Additional pore volume, due to mesoporosity and macroporosity, can be measured for samples that contain non-zeolitic material. The ratio of micropore volume to total pore volume is measured and compared in Table 2 for several samples. For the samples prepared using the disclosed method, this ratio is typically very high and is measured to be between 91-94% for the samples in Examples 1, 2, and 3. For the Comparative examples, this ratio is low and is normally below 90%. These data indicate that CHA zeolite samples prepared using the disclosed methods have higher crystallinity than the comparative samples.

Surface Area Measurements:

Surface area was determined in accordance with the well-known BET (Brunauer-Emmett-Teller) nitrogen adsorption technique, also referred to as the "BET method." Herein the general procedure and guidance of ASTM D4365-95 is followed in the application of the BET method to the materials according to the present disclosure. To ensure a consistent state of the sample to be measured, all samples are pretreated. Suitably pretreatment involves heating the sample, for example to a temperature of 400 to 500° C., for a time sufficient to eliminate free water, such as 3 to 5 hours. In one embodiment, the pretreatment comprises heating each sample to 500° C. for 4 hours.

Thermogravimetric Analysis:

It is well known that CHA zeolites prepared exclusively in the presence of the N,N,N-trimethyl-1-adamantyl ammonium (TMAda$^+$) OSDA contain one TMAda$^+$ cation per CHA zeolite cage. This allows for simple determination of the crystallinity of a CHA zeolite sample by measuring the amount of organic material that is removed during thermogravimetric analysis (TGA). A highly crystalline sample will have a TMAda$^+$/cage value of 1, while CHA samples containing excess TMAda$^+$ cations associated with non-crystalline regions will have values in excess of 1. For the samples prepared using the disclosed method, this ratio is typically very close to 1 and is measured to be 0.98-1.03 for the samples in Examples 1, 2, and 3. For the Comparative examples, this ratio is significantly greater than 1 and is between 1.07 and 1.19. TGA experiments were performed on a Mettler Toledo TGA/DSC 1 w/GC200 Gas Controller with sample weights of ~20 mg and Ultra Zero Air flowing at 80 mL/min. Heating profile was 25° C. to 1000° C. at 2° C./min. SDA cations per CHA cage calculations include the assumption that the weight loss in the organic decomposition region of the TGA profile (T~360-640° C.) is essentially all N,N,N-trimethyl-1-adamantyl ammonium (TMAda$^+$) cations.

Figure 8:
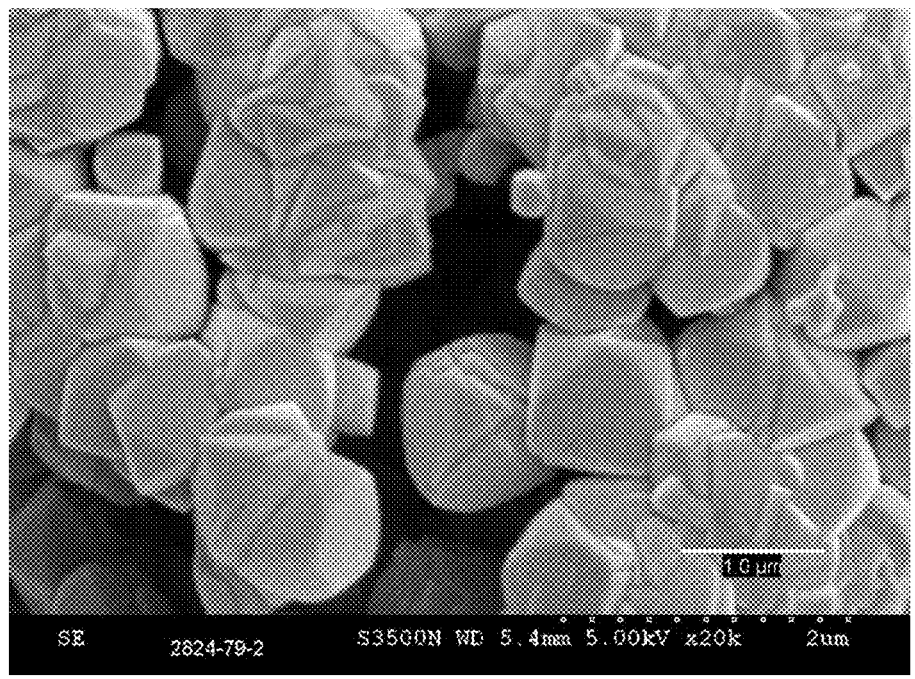
FIG. 8 SEM image of Example 1.
Figure 9:
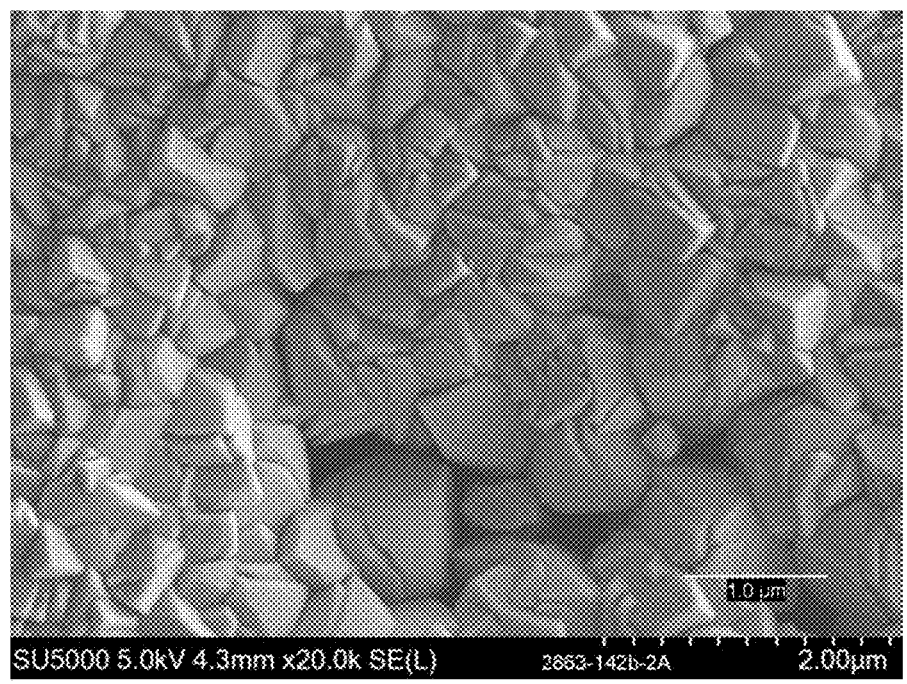
FIG. 9 SEM image of Example 2.
Figure 10:
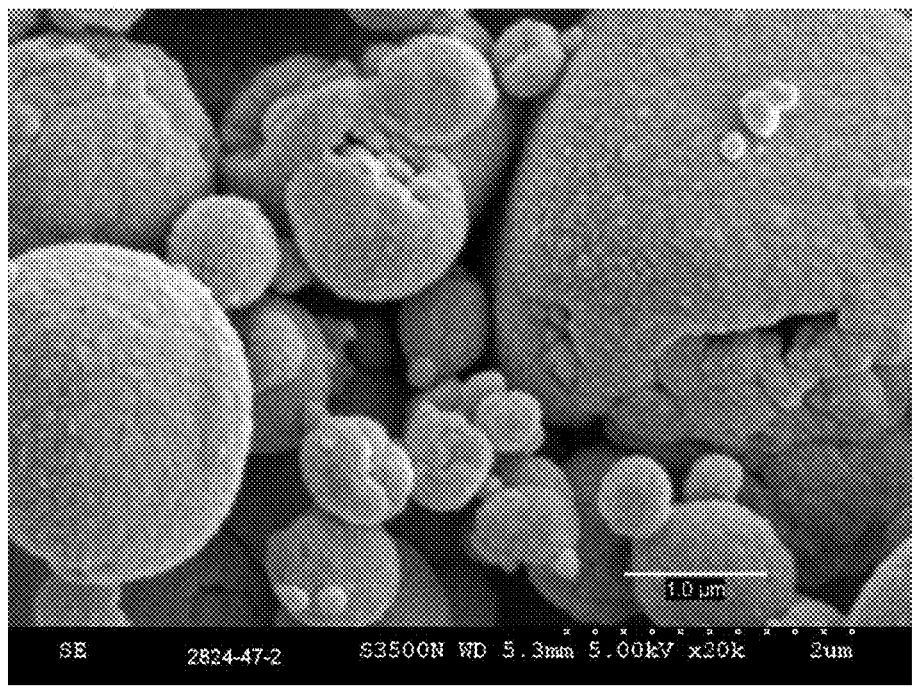
FIG. 10 SEM image of Comparative Example 1.
Figure 11:
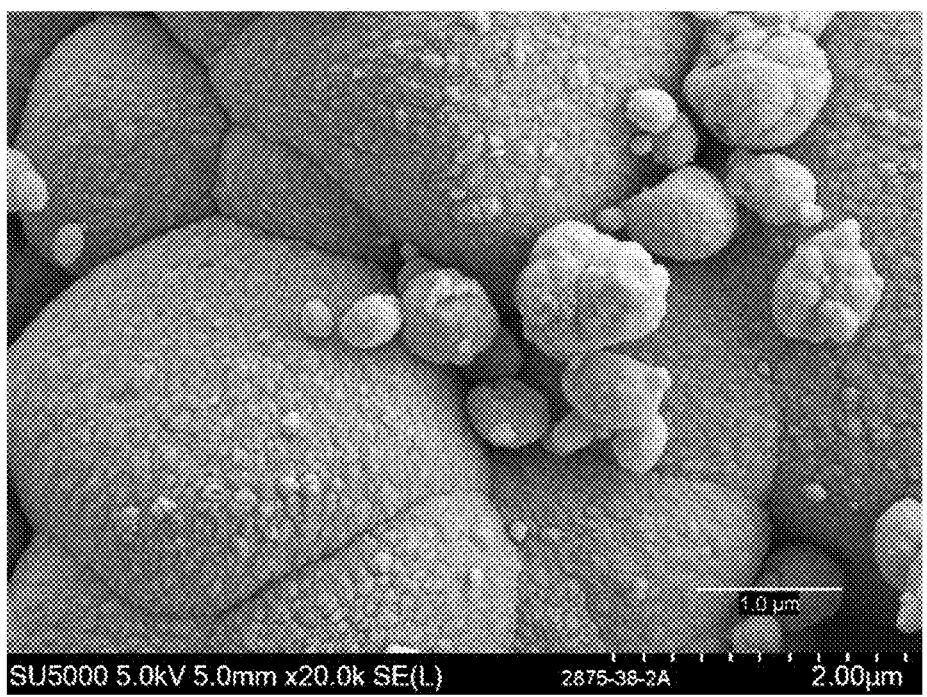
FIG. 11 SEM image of Comparative Example 2.
Figure 12:
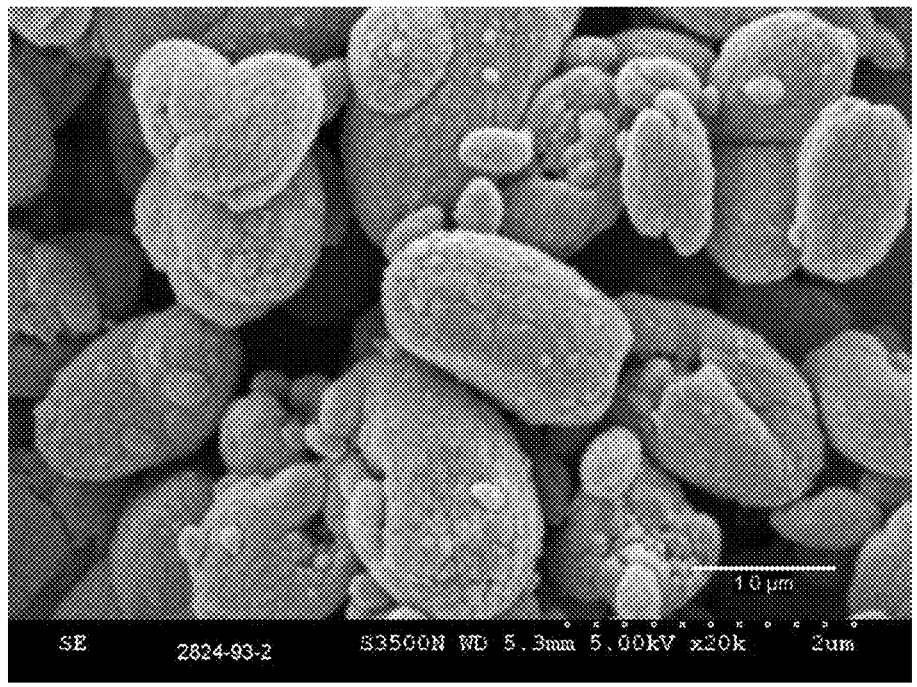
FIG. 12 SEM image of Comparative Example 3.
Figure 13:
FIG. 13 SEM image of Comparative Example 5.
Figure 14:
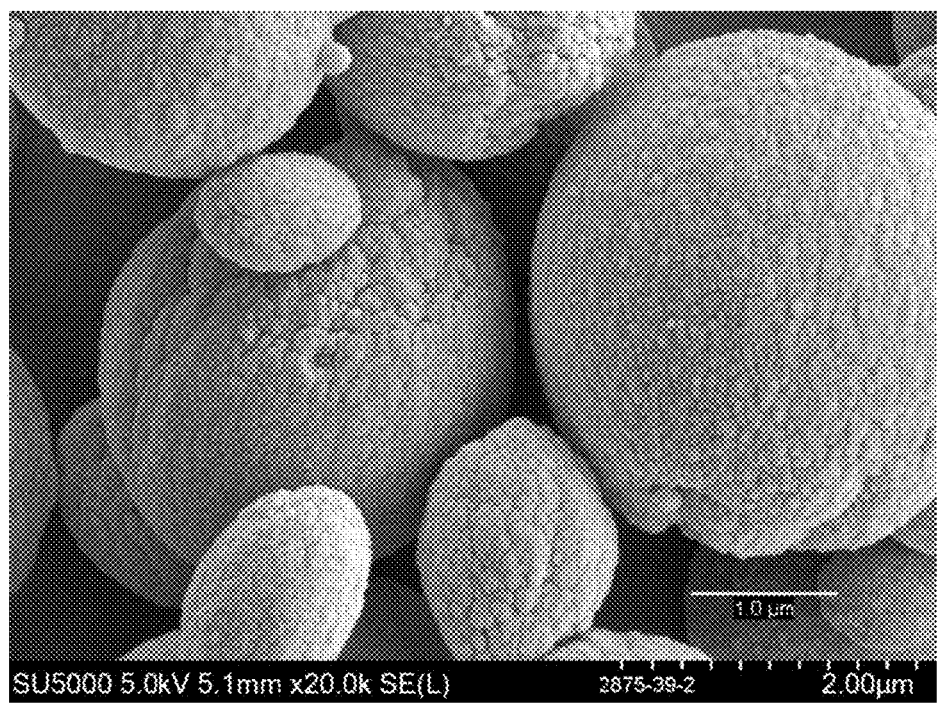
FIG. 14 SEM image of Comparative Example 6.
Figure 17:
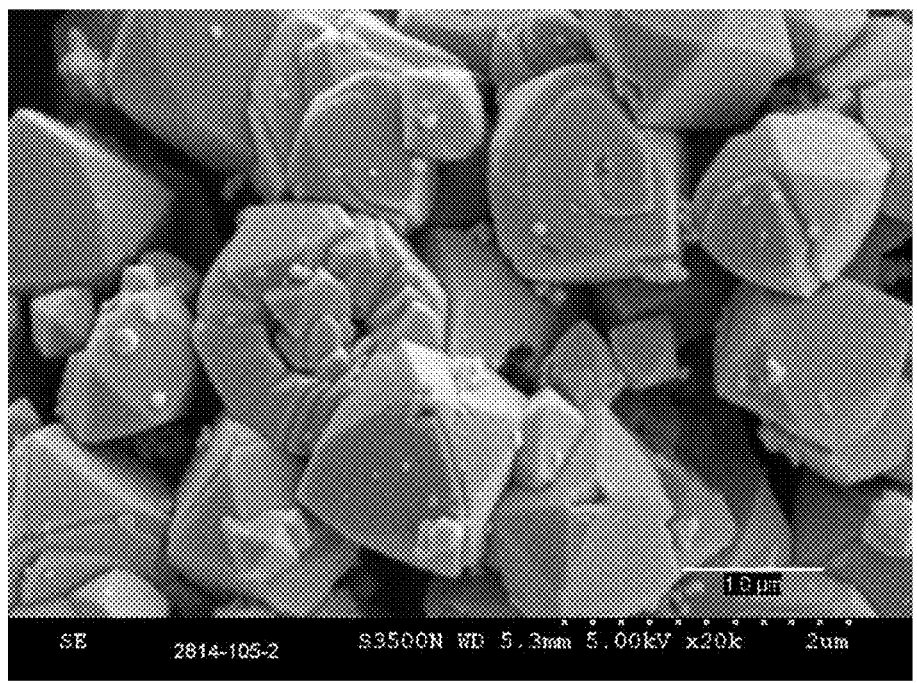
FIG. 17 SEM image of Example 3.

Scanning Electron Microscope (SEM) Images:

Zeolite materials with meso- and macroporosity are often characterized using SEM imaging because the materials are expected to have enhanced surface roughness (for example, see Zeolites and Catalysis, Synthesis, Reactions and Applications, Vol. 1., Edited by Cejka, Corma, Zones, 2010 Wiley-VCH). For the CHA zeolite samples prepared using the disclosed methods (Examples 1, 2, and 3), the SEM images show crystals with smooth crystal surfaces (FIGS. 8, 9, and 17). The SEM images of the comparative examples (FIGS. 10-16) all indicate crystals with increased surface roughness that can be attributed to non-zeolitic material on the surfaces of the zeolite crystals. This non-zeolitic material results in a Cu-CHA catalyst with poor stability.

TABLE 2

Analytical data for samples prepared from method described in this patent application compared to samples prepared from prior reported methods.

| Entry | Micro PV | Total PV | Micro PV / Total PV | Calculated No. SDA cations per CHA cage+ | Calculated No. SDA cations per CHA cage‡ | SEM analysis |
|---|---|---|---|---|---|---|
| Example 1 | 0.31 | 0.33 | 94% | 1.03 | 1.05 | Smooth crystal surface |
| Example 2 | 0.30 | 0.32 | 93% | 1.03 | 1.06 | Smooth crystal surface |
| Example 3 | 0.29 | 0.31 | 91% | 0.98 | | Smooth crystal surface |
| Comp. Example 1 | 0.31 | 0.37 | 84% | 1.08 | 1.11 | Rough crystal surface |
| Comp. Example 2 | 0.31 | 0.36 | 85% | 1.07 | 1.11 | Rough crystal surface |
| Comp. Example 3 | 0.32 | 0.37 | 86% | | | Rough crystal surface |
| Comp. Example 4 | 0.32 | 0.36 | 88% | | | Rough crystal surface |
| Comp. Example 5 | 0.33 | 0.36 | 91% | 1.13 | 1.14 | Rough crystal surface |
| Comp. Example 6 | 0.32 | 0.36 | 87% | 1.10 | 1.11 | Rough crystal surface |
| Comp. Example 7 | 0.33 | 0.40 | 84% | | | Rough crystal surface |
| Comp. Example 8 | 0.33 | 0.39 | 85% | 1.19 | | Rough crystal surface |

TABLE 2-continued

Analytical data for samples prepared from method described in this patent application compared to samples prepared from prior reported methods.

| Entry | Micro PV | Total PV | Micro PV Total PV | Calculated No. SDA cations per CHA cage+ | Calculated No. SDA cations per CHA cage‡ | SEM analysis |
|---|---|---|---|---|---|---|
| Comp. Example 9 | 0.32 | 0.37 | 86% | 1.13 | 1.16 | Rough crystal surface |

+Determined by thermogravimetric analysis,
‡Determined by nitrogen content analysis.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A method of making a microporous crystalline material, the method comprising:
    mixing reaction mixtures comprising sources of alumina, silica, water, TMAdaOH and optionally a chabazite seed material to form a gel, wherein the reaction mixtures are essentially void of alkali metal cations, wherein the source of TMAdaOH comprises N,N,N-trimethyl-1-adamantyl ammonium (TMAda+) organic as the sole OSDA;
    heating the gel in a vessel at a temperature ranging from 80° C. to 200° C. to form a crystalline chabazite product; and
    calcining the product to produce an aluminosilicate zeolite having a CHA structure, and a silica-to-alumina ratio (SAR) ranging from 20 to 100.

2. The method of claim 1, wherein the reaction mixtures with (A) molar composition 1 $SiO_2$:w $Al_2O_3$:x TMAdaOH:y $H_2O$, where w=0.010-0.050, x=0.04-0.20, y=1-25 and (B) trace concentrations of alkali cations.

3. The method of claim 2, wherein w ranges from 0.014-0.050.

4. The method of claim 2, wherein x ranges from 0.05-0.15.

5. The method of claim 2, wherein y ranges from 5-20.

6. The method of claim 1, wherein the aluminosilicate zeolite has a silica-to-alumina ratio (SAR) ranging from 20-70.

7. The method of claim 1, further comprising adding to the microporous crystalline material at least one metal chosen from copper, iron or combinations thereof to form a metal containing chabazite.

8. The method of claim 7, wherein the metal containing chabazite retains at least 70% of its initial surface area and micropore volume after exposure to temperatures of up to 900° C. in the presence of up to 10 volume percent water vapor for up to 1 hour.

9. The method of claim 7, wherein copper and/or iron are introduced by liquid-phase or solid ion-exchange or impregnation or incorporated by direct-synthesis.

10. The method of claim 9, wherein copper comprises at least 1.0 weight percent of the total weight of the material.

11. The method of claim 10, wherein copper comprises an amount ranging from 1.0 to 6.0 weight percent of the total weight of the material.

12. The method of claim 7, wherein iron comprises at least 0.5 weight percent of the total weight of said material.

13. The method of claim 12, wherein iron comprises an amount ranging from 0.5 to 6.0 weight percent of the total weight of said material.

14. The method of claim 1, wherein the source of alumina is aluminum trihydroxide.

15. The method of claim 14, wherein the aluminum trihydroxide is dissolved into a TMAdaOH solution.

16. The method of claim 1, wherein the source of silica is a silica sol.

17. The method of claim 1, wherein during heating, the gel is stirred while a seed material with a CHA topology is added before loading into an autoclave.

18. The method of claim 1, wherein after calcining the calcined zeolite was ion-exchanged with copper in a copper (II) acetate solution.

19. The method of claim 18, wherein the initial surface area of the copper containing chabazite is at least 650 $m^2$/g.

20. The method of claim 18, wherein the initial micropore volume of the copper containing chabazite is at least 0.25 cc/g.

* * * * *